United States Patent
Kong et al.

(10) Patent No.: US 6,882,678 B2
(45) Date of Patent: Apr. 19, 2005

(54) METHOD AND SYSTEM FOR CANCELING MULTIPLE ACCESS INTERFERENCE IN CDMA WIRELESS COMMUNICATION SYSTEM

(76) Inventors: Ning Kong, 1511 E. 5th St., Long Beach, CA (US) 90802; Xue-Song Zhou, 12655 Caminito Radiante, San Diego, CA (US) 92130

(*) Notice: Subject to any disclaimer, the term of this patent is extended or adjusted under 35 U.S.C. 154(b) by 860 days.

(21) Appl. No.: 09/728,459

(22) Filed: Dec. 1, 2000

(65) Prior Publication Data

US 2002/0067761 A1 Jun. 6, 2002

(51) Int. Cl.[7] ................................................ H04L 27/30
(52) U.S. Cl. ........................ 375/144; 375/148; 375/349; 370/334; 370/441; 370/479; 455/52.3; 455/65; 455/278.1; 455/303
(58) Field of Search ................................. 375/144, 148, 375/343, 346, 349, 350; 370/317, 320, 333, 334, 335, 342, 441, 479; 455/50.1, 52.3, 54.1, 63, 65, 67.3, 133–135, 137, 271–273, 278.1, 296, 303, 307

(56) References Cited

U.S. PATENT DOCUMENTS

| | | | | |
|---|---|---|---|---|
| 5,644,592 A | * | 7/1997 | Divsalar et al. | ............ 375/147 |
| 5,999,560 A | * | 12/1999 | Ono | ............ 375/148 |
| 6,215,814 B1 | * | 4/2001 | Ylitalo et al. | ............ 375/148 |
| 6,570,864 B1 | * | 5/2003 | Kim et al. | ............ 370/342 |

* cited by examiner

Primary Examiner—Dac V. Ha
(74) Attorney, Agent, or Firm—East IP Group; Philip K. Yu

(57) ABSTRACT

A receiver for the third-generation ("3G") CDMA wireless system is disclosed. The receiver is adapted to mitigate the correlated interference by adaptive antenna process which will maximize the signal-to-interference-plus-noise ratio. After the mitigation of correlated interference from first step space process, the second step is to counter fading with MRC which is optimum after the mitigation of correlated interference. After these first two steps of interference mitigation by adaptive antennas and fading compensation through MRC, the decision signal for the first stage of MPIC will have the strongest desired part and least interference compared to any MPIC available. As can be appreciated, the first stage BER of the present receiver will be the lowest. Then, this low BER will result in a more accurate MAI regeneration, which will further cause a lower BER for the next stage and any subsequent stages. Therefore, the BER of the receiver of the present invention is more likely to converge to the BER of a single user, i.e. MAI-free, faster than those in the conventional systems. In other words, for a given BER requirement, the receiver of the present invention will take the least number of iterations to achieve.

3 Claims, 5 Drawing Sheets

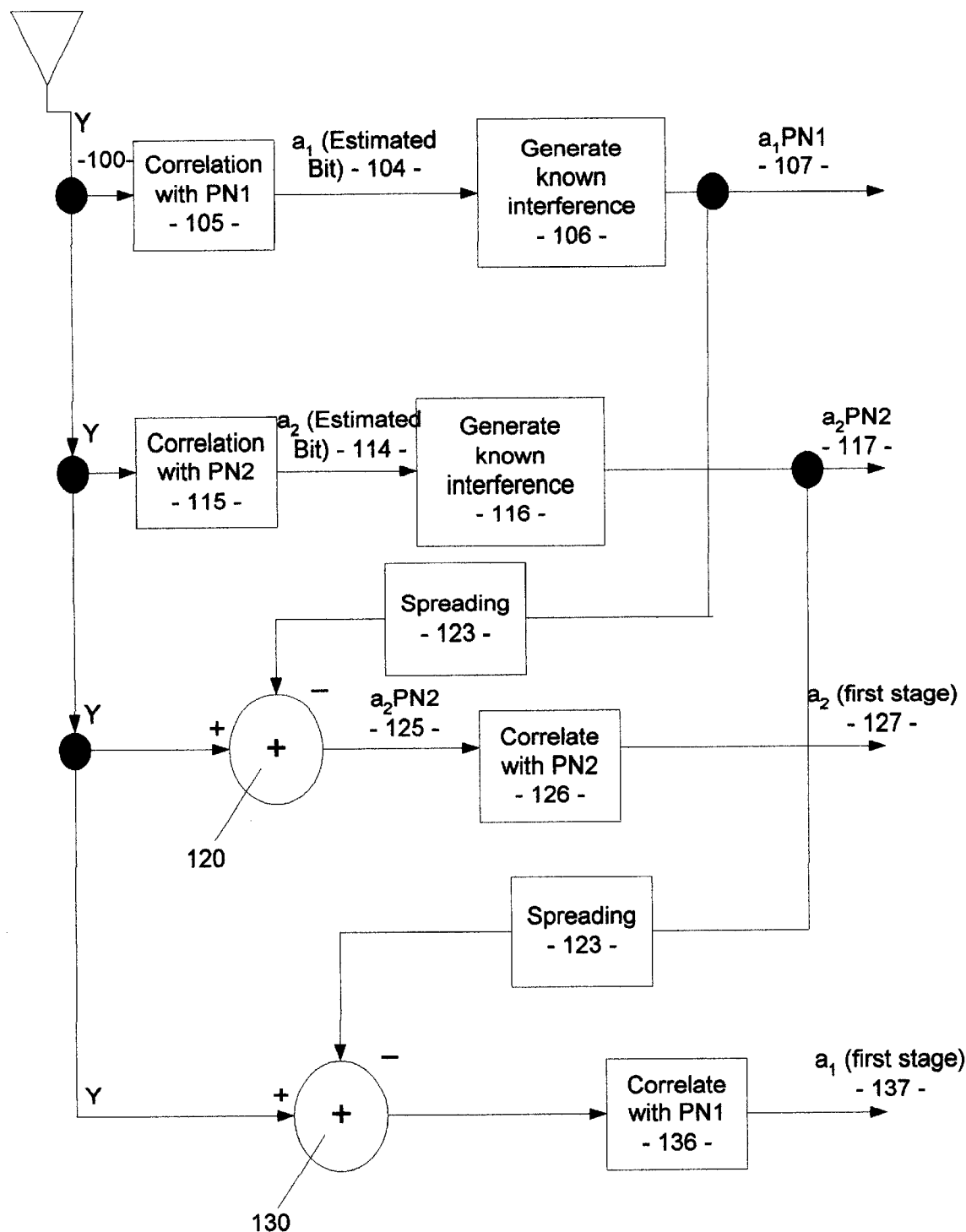
Fig. 1 (a) (Prior Art)

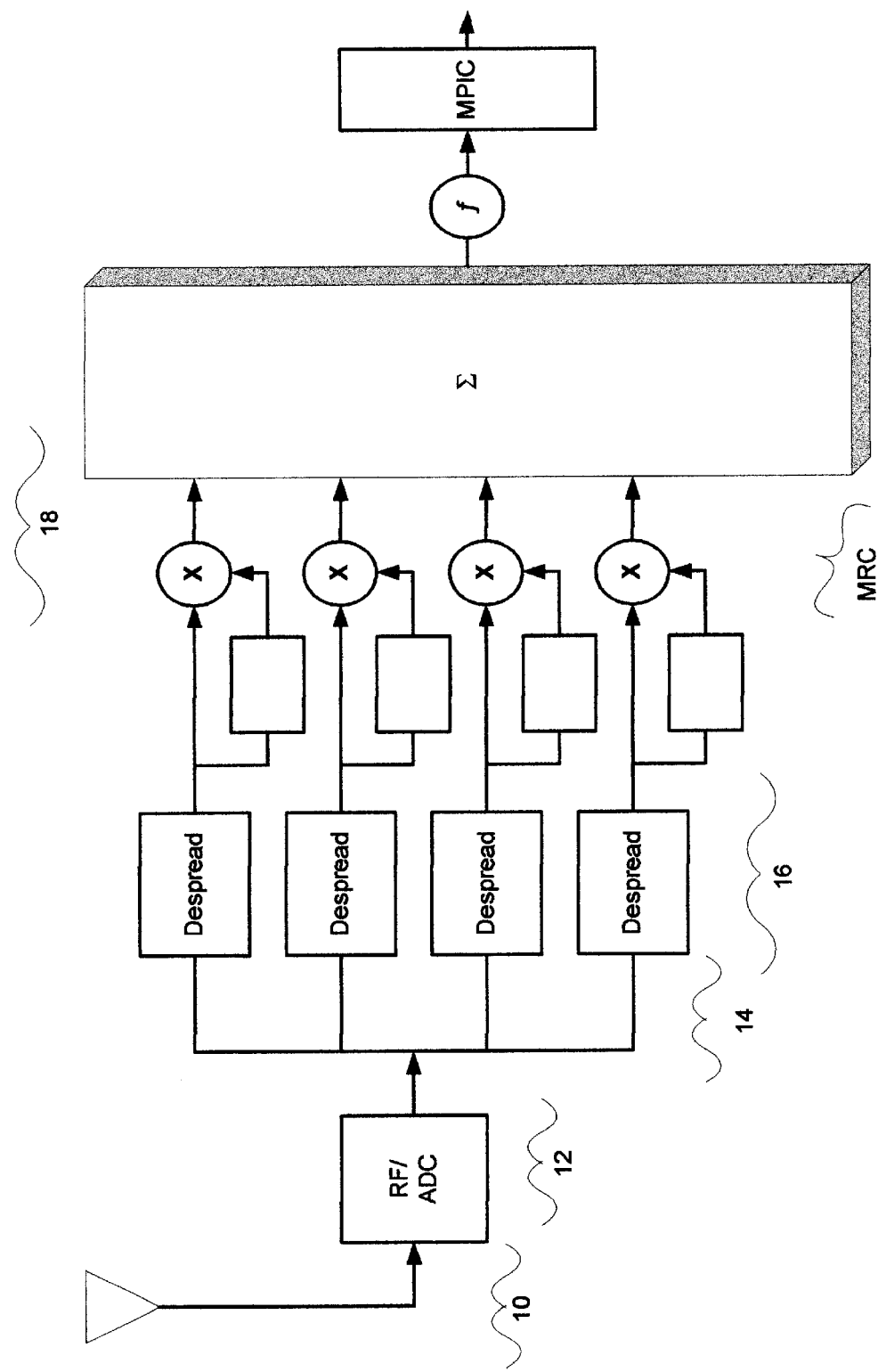
Fig. 1 (b) (PriorArt)

METHOD AND SYSTEM FOR CANCELING MULTIPLE ACCESS INTERFERENCE IN CDMA WIRELESS COMMUNICATION SYSTEM

FIELD OF INVENTION

The present invention relates to wireless communication systems and more particularly relates to receivers using code division multiple access ("CDMA") techniques for wireless communication systems.

ART BACKGROUND

IS-95 CDMA, or commonly called CDMA, is a digital cellular radio system that has been in use in over 35 countries in the world. In 1998, over 23 million CDMA phones were in use and the prediction is that by the year 2002, there will be over 106 million CDMA phones. A CDMA network can provide for mobile voice communication as well as many new advanced services like mobile fax and text messaging.

As is well known in the art, CDMA is a form of spread spectrum communication, which transmits a radio signal over a radio channel that is much wider than necessary to transmit the original information signal (typically voice). Since the signal is spread over a very wide bandwidth, interference from other users within that bandwidth can be made minimal. This allows multiple users to share the radio channel at the same time by assigning a unique code sequence to each mobile radio. For more background regarding CDMA or CDMA IS-95, reference can be made to a book, entitled CDMA IS-95 FOR CELLULAR AND PCS, by Lawrence Hart, McGraw-Hill, 1999. A U.S. Pat. No. 4,901,307, issued Feb. 13, 1990, entitled "Spread Spectrum Multiple Access Communication System Using Satellite or Terrestrial Repeaters" also discloses the use of CDMA techniques in a multiple access communication system. Both of the above publications are incorporated herein by reference.

Despite progress made in CDMA to minimize interference, there is still the undesirable interference from multiple access ("MAI"). As can be appreciated by those skilled in the art, MAI is caused by non-zero cross-correlation between codes used to separate multiple users at the same time and in the same frequency band. In other words, the signal received by a CDMA receiver, whether it is at the base station or at the user's handset, represents the sum of all users' signals. Once received, the receiver uses the desired user's code to correlate and filter out the desired user's signal.

In the conventional design for CDMA base station receivers, MAI is treated as a Gaussian noise without any mitigation or cancellation. The receiver matches to the code of the desired user and decodes its information.

One conventional MAI cancellation technique is what is known as the Multistage Parallel Interference Cancellor ("MPIC"). The MPIC for base stations was first proposed in 1990 by Varanasi and Aazhang, "Multi-Stage Detection in Asynchronous Code-Division Multiple-Access Communications," *IEEE Transactions on Communications,* vol. 38, pp. 509–519, April 1990, the disclosure of which is incorporated herein by reference. The MPIC technique generally works in the following stages. First, each user's signal is demodulated as in the conventional receiver, but the estimated bits are not final. Second, these estimated bits are used to regenerate the spread signal, which is MAI with respect to the desired signal. Third, the regenerated MAI is subtracted from the received signal for each user. Fourth, repeat the first step until the required performance is met.

FIG. 1 shows a simplified conventional MPIC for a base station receiver. For the sake of illustration, only 2 users' bits, $a_1$ and $a_2$, are discussed. At box 105, the received signal Y (100) is correlated with $PN_1$ to generate an estimated bit for $a_1$ (104). This estimated bit is used to generate known interference of $a_1 PN_1$ (107) with respect to another user bit $a_2$. This signal is further spreaded and weighted by its respective channel to replicate the signal received by the antenna (123, 124). The received signal Y is then subtracted by the known interference $a_1 PN_1$, which has been spreaded and weighted, to generate $a_2 PN_2$, which is then correlated with PN2 to derive the user bit $a_2$. Similar steps are taken to derive $a_1$. At this time, both $a_1$ and $a_2$ are considered a "first stage" value, since this MPIC process can be extended multiple times to fine-tune the value, provided the system processing resources are available.

Reference is now to FIG. 1(*b*), where another simplified diagram illustrating the conventional enhanced MPIC with multiple fingers used by the receivers. The receiver uses an antenna 10 and RF/ADC 12 to convert the received composite signals to composite baseband digital signals. The composite baseband signals are then split into multiple fingers 14, where the number of fingers equals the number of multipaths, for despreading 16, i.e. correlating the composite baseband signals with the PN of a desired user. The despreading generates a single user's multipath signal, which unfortunately still contains MAI. Each finger is then applied to maximal ratio combining ("MRC") 18, weighted by the complex conjugate of the channel gain estimate for each multipath to increase the SNR the same number of times as the number of fingers. The output of the MRC 18 will be used to estimate the present stage information bits.

As can be appreciated by those skilled in the art, the conventional enhanced MPIC technique has the following advantages: low delay compared to serial cancellation, low complexity, since its complexity grows only linearly with the number of users, and incremental operation and performance. This MPIC can also achieve better performance than that of a simple MPIC due to lower initial BER from MRC.

The conventional enhanced MPIC, however, still has its drawback. At low signal-to-noise ratio ("SNR") and limited multipath environment, better performance (than matched-filter) cannot be guaranteed, since the estimated bits tend to be wrong. Such error causes bad MAI generation for cancellation.

Aiming at decreasing the bit-error rate ("BER") to increase the reliability of the MAI regeneration, it has been proposed to use smart antennas to enhance the multipath intensity profile ("MIP") and to achieve space diversity SNR gain, which ensures a lower BER on every cancellation stage. With the help of space processing, the number of iterations can be reduced significantly for a specified BER.

However, the underlying assumption for using antennas to increase diversity gain has been that the interference surrounding the desired user is uncorrelated among the antenna inputs. Such assumption is true when there are more than five users of equal power, which is a typical scenario of a 2G wireless system where voice users are dominating. But, this assumption tends to fail in the cases where there are fewer than five users around the desired user, where all users are high-speed data users, or where there is one or two high speed data users with other voice users around the desired user.

As can be appreciated by those skilled in the art, the above two cases can be typical scenario in a third generation system ("3G") such as the CDMA-2000 with radio configuration ("RC") higher than 3, where high-speed data users trade many voice users. The assumption tends to fail in first case in due to the fact that the interference will not appear like white Gaussian noise if only a small number of users. The assumption fails in the second case is due to the few high-speed data users carrying much higher power and their effects on the different antennas being correlated for the same reason that CLT cannot apply to make it Gaussian noise. Also, when the high-speed data users are active, the number of voice users will be reduced based on the rule of trading the Walsh codes for the data rate, thus making the voice users appear less like Gaussian.

Therefore, antenna diversity gain is not achievable when the interference are correlated as in the cases described in a 3G system. However, antenna process can be performed to mitigate the correlated interference.

Also, it is desirable to cancel the correlated interference before it gets into time process, because MRC is not optimal with correlated interference among fingers.

SUMMARY OF THE PRESENT INVENTION

A 3G CDMA STMSINRMPIC receiver is disclosed. The receiver is adapted to mitigate the correlated interference by adaptive antenna process which will maximize the signal-to-interference-plus-noise ratio. After the mitigation of correlated interference from first step space process, the second step is to conquer fading with MRC which is optimum after the mitigation of correlated interference or correlated MAI. After these first two steps of interference mitigation by adaptive antennas and fading compensation through MRC, the decision signal for the first stage of MPIC will have the strongest desired part and least interference compared to any MPIC available. As can be appreciated, the first stage BER of the present STMSINRMPIC will be the lowest. Then, this low BER will result in a more accurate MAI regeneration, which will further cause a lower BER for the next stage and any subsequent stages. Therefore, the BER of the STMSINRMPIC of the present invention is more likely to converge to the BER of a single user, i.e. MAI-free, faster than those in the conventional systems. In other words, for a given BER requirement, the STMSINRMPIC of the present invention will take the least number of iterations to achieve.

More specifically, the method and system comprise the following. For each user, inputs from the multiple antenna are weighted and combined by maximizing their SINR for each same multipath. For each user, the multipath signals are coherently combined by using maximal ratio combining to estimate the bit of the desired user for the first stage of MPIC. Based on the estimated bits, the MAI for all users is generated and subtracted from the received signals. Each user's bit can then be estimated for the second stage again and MAI is generated, for the third stage and so on, until a required level of performance is reached.

BRIEF DESCRIPTION OF THE DRAWINGS

FIG. 1(a) is a simplified system diagram for a conventional MPIC.

FIG. 1(b) is a simplified diagram showing the convention receiver with MRC and MPIC.

DETAILED DESCRIPTION OF THE PREFERRED EMBODIMENT

A method and system for canceling multiple access interference in CDMA wireless communication system is disclosed. In the following detailed description, numerous specific details are set forth in order to provide a thorough understanding of the present invention. However, it will be apparent to one of ordinary skill in the art that these specific details need not be used to practice the present invention. In other circumstances, well known structures, circuits and interfaces have not been shown or described in detail in order not to unnecessarily obscure the present invention.

Figure 2:
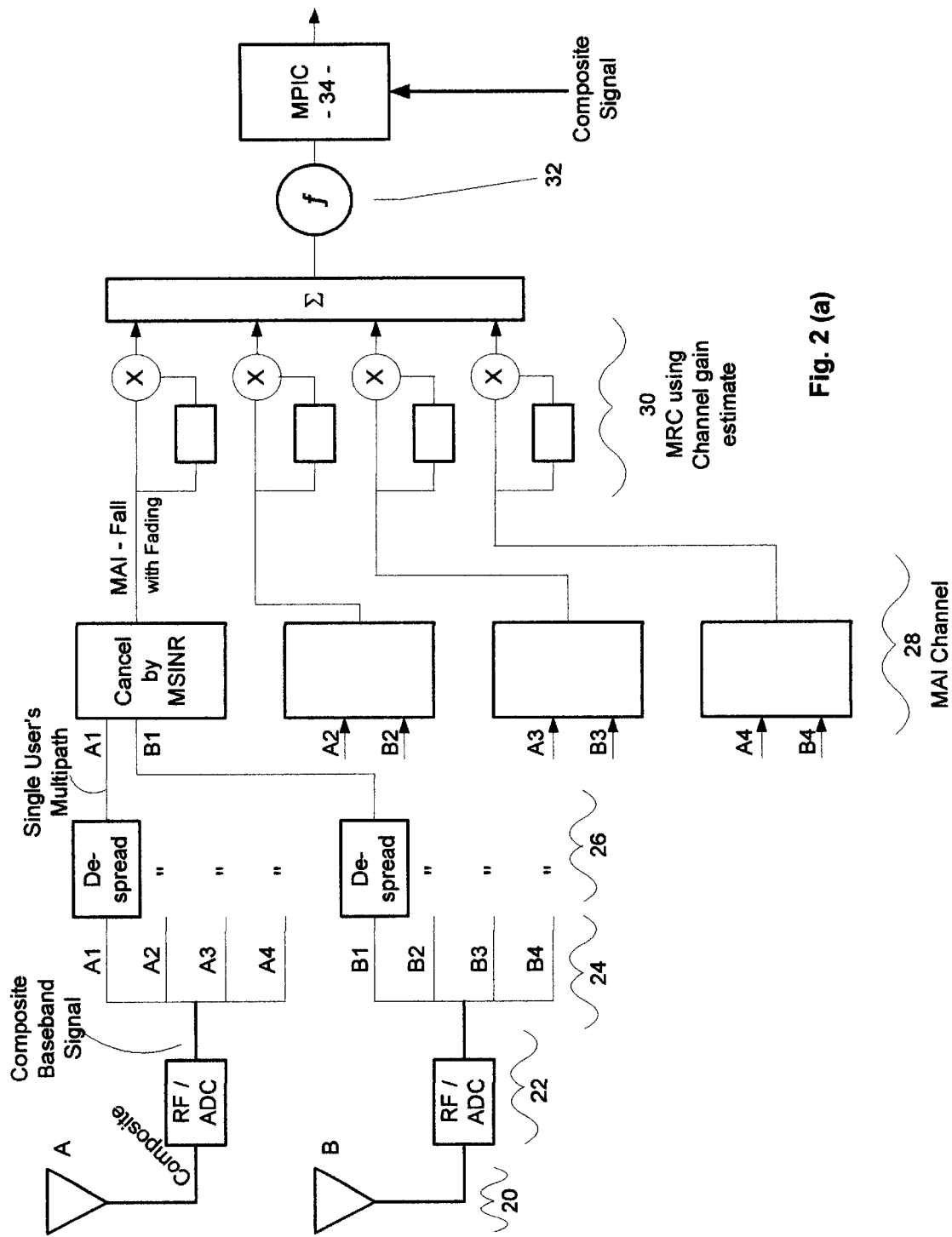
FIG. 2(a) is a simplified system diagram of one embodiment of the present invention.
FIG. 2(b) is a simplified system diagram of another embodiment of the present invention.
Figure 2:
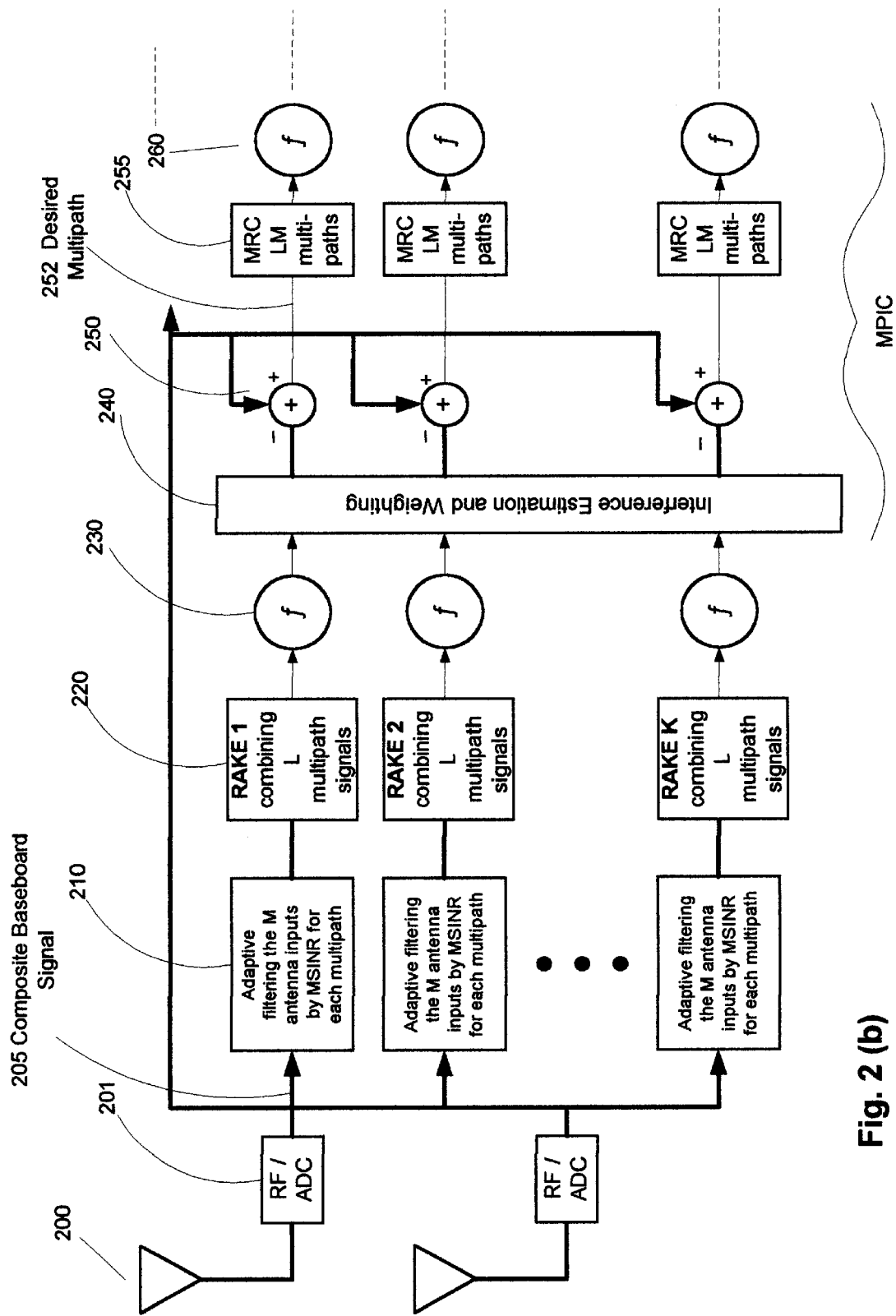

Reference is first turned to FIG. 2(a), where a simplified system diagram of one embodiment of the present invention is shown. The receiver in accordance with the present invention can be implemented with multiple antennas. However, for the sake of description, two antennas are shown in FIG. 2(a). Those skilled in the art can readily expand the number of antennas based on the teaching of the description. In this receiver, 2 antennas 20 are used to receive the multiple users' signals, with each user's signal also containing a unique pilot signal as required by the wireless transmission system.

The composite signals are processed by the RF/ADC 22 to be down-converted to baseband composite multipath digital signals, which are then split into a number of fingers, where the number of fingers equals the multipaths, e.g. 4 fingers, for despreading 26. After despreading, each finger contains the desired user's multipath signal, as well as the MAI.

The same multipath signals from each antenna are "space processed" by maximizing their signal to interference plus noise ratio ("MSINR") 28. For example, antenna A's finger No. 1 is grouped with antenna B's finger No. 1, e.g. A1 and B1. Similarly, A2 and B2, A3 and B3 and A4 and B4. In each group, synchronization timing information can be shared, since the propagation time between antennas is negligible, i.e. 0.001 uSec, compared to multipath resolving time, Tc=1 uSec. The output from the space process 28 are MAI-mitigated signals with fading. Each output is then applied to a maximal ratio combiner 30, using channel gain estimate derived from the desired user's pilot signal.

After the MRC 30, each bit of the desired user can be estimated, which is a much better estimate than the conventional MRC-only process. The estimated bit is then used to cancel the MAI in a MPIC 34.

As can be appreciated by those skilled in the art, the MPIC process can be repeated until a desired performance criteria is achieved.

Reference is now turned to FIG. 2(b), where a simplified block diagram of another embodiment of the present invention is shown. By employing more than one antenna 200, the CDMA receiver in accordance with the present invention can achieve better signal-to-interference-and-noise ratio ("SINR") to estimate the MAI for cancellation. As can be appreciated by those skilled in the art, as the frequency for wireless communication increases, e.g. 800 MHz for CDMA and 1800 MHz for PCS, the wave length ($\lambda$) decreases. Such reduction in $\lambda$ makes deployment of multiple antennas both feasible and practical for the receivers at the base stations, as well as the hand sets.

Referring to FIG. 2(b), in accordance with the present invention, multiple antennas 200 and RF/ADC 210 are implemented at the receiver of a wireless communication system, e.g. at the base station or at the hand set. Since the interference on different antennas may be correlated, conventional scheme of diversity combining, albeit less complex, may not be optimal for increasing the SNR. Therefore, optimum combining is used over antenna inputs based on the criterion of maximal SINR. Under this criterion, the SINR is maximized as opposed to the SNR being maximized in conventional diversity combining case. When interferences are uncorrelated, MSINR weights automatically reduce to MRC weights; in other words, in the absence of interference, interference cancellation capability becomes diversity gain.

As shown in FIG. 2(b), all corresponding individual path of the multipath propagation received at the antennas are adaptively filtered by maximizing SINR (240). The antenna weights are adjusted based on maximal SINR with the error signal being created by comparing the combined signal with the desired faded signal. Note that the desired faded signal is one without interference but with fading, which can be obtained from either a dedicated pilot or a time-multiplexed pilot. The algorithm to update the weights may be LMS ("least mean square") DMI ("direct matrix conversion"). For the time-multiplexed pilot, when weights need to be updated in the absence of a pilot, the previous estimated bit can be used as the desired signal, which is called "decision-directed" update. The above steps can be called the "space process" by virtue of its utilizing signal space correlation. For example, the $1^{st}$ multipath signal from the $1^{st}$ antenna and the $1^{st}$ multipath signal from the $2^{nd}$ antenna, and the $1^{st}$ multipath signals from any other antennas, are weighted and combined by maximizing SINR.

After adaptive filtering 210 and the MAI having been mitigated, the multipath signals for each user are combined by maximal ratio combining 220 ("MRC") in a rake processor, which is a processor well-known to those skilled in the art of wireless communication. Here, the linear adaptive combiner output is coherently combined with the rest of the combiner outputs to estimate the bit of the desired user. The weights before combining are the complex conjugate of the channel gain, which is estimated from the pilot. The above coherent combining is also called maximal ratio combining ("MRC"). MRC can be optimized after "space process" to mitigate the interference. The above can be called the "time process" or Rake processing. As can be appreciated by those skilled in the art, a Rake process is not optimal in the presence of correlated MAI.

The resultant signal from each rake processor 220 is applied to a decision-maker 230, which may be realized by using an "integrate-and-dump" circuit, as can be appreciated by those skilled in the art.

The output from the decision-maker 230 is applied to interference estimation and weighting 240. "Interference estimation" involves generating an interferer's spreaded faded signal from the interferer's estimated bit, whereas the spreaded faded signal looks like the interferer's signal coming in from the antenna. "Weighting" involves multiplying the interference signal with a constant, where $0<\alpha<=1$, depending on how reliable the generated interferer's signal is. The output represents an estimate of the interference from all other users.

Based upon the estimated bits, the MAI for all the users can be generated and subtracted (205) from the received composite signals to derive a cleaner signal 252 for the desired user. Another MRC 255 of the L times M multipath signals is MRC combined to get a better estimated bit in 250

Note that the MAI cancellation 240, 252 and through 260, can be repeated until the required level of performance is reached.

As can be appreciated by those skilled in the art, the present invention provides an adaptive array process (exploiting the dimension of space for correlated MAI cancellation) which optimizes subsequent MPIC time process in the presence of correlated MAI. The optimization of MPIC is achieved by the first part of space process to cancel the correlated MAI since the MRC among fingers is not optimal in the presence of correlated MAI. Therefore, the combination of space and time process produces a lower bit-error rate (BER) for every demodulation stage, consequently better MAI estimates and fast convergence to the desired performance. For ease of description, this space-time MPIC is called space-time maximal signal-to-interference-plus-noise ratio MPIC ("STMSINRMPIC").

Figure 3:
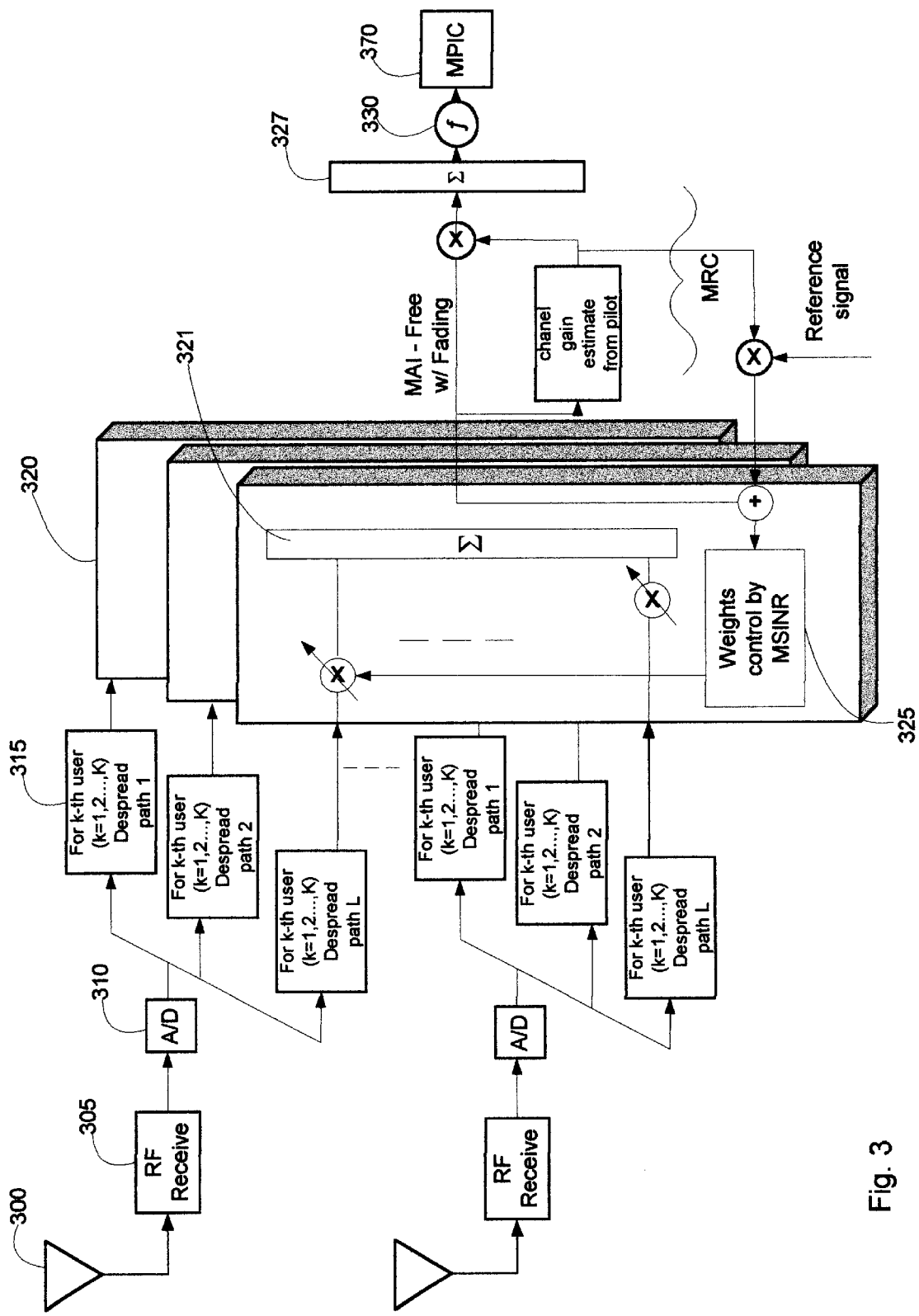
FIG. 3 is a simplified system diagram of another embodiment of the present invention.

Referring to FIG. 3, a simplified system diagram of another embodiment with adaptive antenna space processing is shown. For the sake of description, it is assumed that there are "M" number of antennas, "L" number of multipath signals and "K" number of users. Signals arrived at antennas 300 are received by RF receiver 305 and converted by analog-to-digital converter 310. After the ADC, the "L" multipath signals are split into L "fingers", each of which is an independent demodulation process, for each user of the K users, for despreading 315.

After each multipath is despreaded (315) the corresponding multipath signals from each antenna are weighted (325) and combined (321) to maximize the SINR (320).

All the combined signals from all the rake processors 320 are further combined using MRC 327, with the result applied to an estimator 330. This generates an estimated bit for MPIC 370 processing.

The desired signal (or the reference signal), which is used to generate the error signal, is available in the follow ways:
1) Dedicate pilot channel (as in CDMA2000 standard);
2) Time-multiplexed pilot (as in W-CDMA UMTS/IMT-2000 standard);
3) Tentative decision data symbols, if pilots are not available.

The STMSINRMPIC of the present invention can thus achieve higher SINR to support lower BER for each estimated bit in each iteration, thus enabling more accurate MAI cancellation. Also, the STMSINRMPIC reduces the number of iterations compared with pure MPIC or other space-time diversity MPIC schemes.

Obviously, numerous modifications and variations of the present invention are possible in light of the above teachings. It is therefore to be understood that within the scope of the appended claims, the invention may be practiced otherwise than as specifically described herein.

We claim:

1. A coded division multiple access (CDMA) receiver, comprising:
   a plurality of antennas, the antennas receiving multiple users' signals of a first frequency, each user's signal comprising a unique pilot signal;
   a plurality of RF receivers, down-converting the multiple users' signals to baseband analog signals;
   a plurality of analog-to-digital converters, converting the baseband analog signals to baseband composite digital signals;
   a plurality of despreaders, each despreader correlating the baseband composite digital signals with pseudonoise of a desired user with a right timing tracking a corresponding multipath signal to generate a desired user's multipath signal, which includes multiple access interference (MAI);

space process means, for each multipath, for weighting the desired user's multipath signal and the MAI from all antennas, and then combining the weighted signals such that a signal-to-interference-plus-noise ratio (SINR) of the combined weighted signal is maximized to mitigate MAI;

first maximum ratio combiner ("MRC"), combining all weighted outputs from each multipath, each weighted output being weighted again by a complex conjugate of a channel gain derived from the desired user's pilot signal to generate a maximal signal-to-noise ratio combined signal for the desired user;

first estimator, for each user, estimating a bit based on the maximal signal-to-noise ratio combined signal;

interference generator, for each user, generating other users' spreaded signals with their channel variation derived from their respective pilot signals;

cancellation means, subtracting other users' spreaded signals from the baseband composite digital signals to generate the desired user's multipath signal;

second MRC, weighting multipath signals by their respective complex conjugate of the channel gain derived from the desired user's pilot signal to generate maximal ratio combined signal for the desired user;

second estimator, for each user, estimating a user's bit based on the maximal ratio combined signal.

2. In a code division multiple access (CDMA) wireless system with multiple users, a method of receiving a desired user's signal by canceling multiple access interference ("MAI") from other users, each user's signal propagating to an antenna through a plurality ("L", "L" being a natural number) of different paths and resulting in multi-path components from each user on each antenna, the method comprising the steps of:

(a) receiving composite RF signals from the multiple users simultaneously, at a plurality ("M", "M" being a natural number) of spatially separated antennas;

(b) down-converting the composite RF signals to base-band signals and converting the base-band signals to digital signals;

(c) separating the digital signals at each antenna by multi-path components and by users;

(d) for each user, weighting and combining corresponding multi-path components from all "M" antennas such that a desired user's signal-to-interference-plus-noise ratio is maximized to generate an adaptively filtered output;

(e) for each user, weighting the adaptively filtered output by a channel complex conjugate gain and combining all "L" adaptively filtered outputs to counter fading;

(f) estimating a first-stage bit for each user using the combined adaptively filtered outputs;

(g) generating MAI from other user's bit estimations, channel gains, and spreading signals;

(h) subtracting MAI for each different path from the composite RF signals and coherently combining L×M cleaned multi-path signals for the desired user; and (i) estimating a desired user's bit.

3. The method according to claim 2, wherein the steps (g) through (i) are repeated until a desired bit-error ratio is reached.

* * * * *